(12) United States Patent
Coffey

(10) Patent No.: US 8,228,641 B2
(45) Date of Patent: Jul. 24, 2012

(54) CONTROLLING MECHANICAL DISTORTION IN A MEMBER

(75) Inventor: Jerome Thomas Coffey, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 308 days.

(21) Appl. No.: 12/611,917

(22) Filed: Nov. 3, 2009

(65) Prior Publication Data
US 2011/0102946 A1    May 5, 2011

(51) Int. Cl.
*G11B 5/55*    (2006.01)
*G11B 21/08*    (2006.01)

(52) U.S. Cl. ........................................ 360/266

(58) Field of Classification Search ........... 360/244.5, 360/265.9, 266, 266.1
See application file for complete search history.

(56) References Cited

U.S. PATENT DOCUMENTS

| | | | |
|---|---|---|---|
| 5,764,444 A * | 6/1998 | Imamura et al. | 360/294.4 |
| 5,793,571 A | 8/1998 | Jurgenson et al. | |
| 5,896,245 A | 4/1999 | Aoyagi et al. | |
| 5,936,805 A | 8/1999 | Imaino | |
| 6,108,175 A | 8/2000 | Hawwa et al. | |
| 6,222,706 B1 | 4/2001 | Stefansky et al. | |
| 6,313,970 B1 | 11/2001 | Pace et al. | |
| 6,366,432 B1 * | 4/2002 | Tadepalli et al. | 360/266 |
| 6,446,325 B1 | 9/2002 | Prater | |
| 6,473,272 B1 * | 10/2002 | Resh et al. | 360/266 |
| 6,493,187 B2 | 12/2002 | Pace et al. | |
| 6,515,834 B1 | 2/2003 | Murphy | |
| 6,590,748 B2 | 7/2003 | Murphy et al. | |
| 6,624,983 B1 | 9/2003 | Berding | |
| 6,680,826 B2 | 1/2004 | Shiraishi et al. | |
| 6,760,194 B2 | 7/2004 | Shiraishi et al. | |
| 6,765,743 B2 | 7/2004 | Goodman et al. | |
| 7,050,270 B1 | 5/2006 | Oveyssi et al. | |
| 7,221,543 B2 | 5/2007 | Utsunomiya | |
| 7,417,830 B1 | 8/2008 | Kulangara | |
| 7,440,234 B1 | 10/2008 | Cheng et al. | |
| 2001/0038515 A1 | 11/2001 | Koganezawa et al. | |
| 2002/0051318 A1 | 5/2002 | Kant et al. | |
| 2002/0097528 A1 | 7/2002 | Williams et al. | |
| 2003/0007294 A1 | 1/2003 | McReynolds et al. | |
| 2004/0012893 A1 | 1/2004 | Tadepalli | |
| 2004/0181934 A1 | 9/2004 | Van Sloun et al. | |
| 2006/0023363 A1 | 2/2006 | Hanrahan et al. | |

(Continued)

*Primary Examiner* — Angel A. Castro
(74) *Attorney, Agent, or Firm* — Mitchell K. McCarthy

(57) ABSTRACT

An actuator and method of using an actuator that operably supports a component of a data transfer assembly. The actuator has a body and an arm extending longitudinally from the body. The arm has a tapered portion defined by laterally converging opposing surfaces from a proximal end of the arm adjacent the body and terminating at a medial longitudinal position of the arm. The arm further has a tip portion extending contiguously from the medial longitudinal position of the arm to a distal end of the arm. The tip portion has laterally opposing protuberant arcuate lobes that cooperatively define a maximum lateral width of the tip portion. In some embodiments the arm has a surface defining an aperture sized for operably swaging a head gimbal assembly (HGA) to the arm. A lateral apex of at least one of the lobes is intersected by a lateral axis that intersects the aperture. The perimeter surface can define a first lateral cross-sectional width of the arm, at a first intersection of a longitudinal axis of the arm with the surface defining the aperture, that is greater than a second lateral cross-sectional width of the arm, at a second intersection of the longitudinal axis of the arm with the surface defining the aperture.

20 Claims, 4 Drawing Sheets

U.S. PATENT DOCUMENTS

| | | |
|---|---|---|
| 2006/0174472 A1 | 8/2006 | Zhang et al. |
| 2007/0041129 A1* | 2/2007 | Shimizu et al. ............... 360/240 |
| 2007/0086114 A1 | 4/2007 | Van Sloun et al. |
| 2008/0304183 A1 | 12/2008 | Kwon et al. |
| 2009/0021009 A1 | 1/2009 | Baumgart et al. |
| 2009/0052088 A1 | 2/2009 | Lim |
| 2009/0080117 A1* | 3/2009 | Shimizu et al. ............ 360/294.4 |
| 2010/0061021 A1* | 3/2010 | Kamibayashi ............. 360/245.2 |

* cited by examiner

CONTROLLING MECHANICAL DISTORTION IN A MEMBER

SUMMARY

In some embodiments an actuator is provided that includes a longitudinally extending arm having a surface defining an aperture sized for operably swaging a head gimbal assembly (HGA) to the arm. The arm further has a perimeter surface defining opposing protuberant lobes. A lateral apex of at least one of the lobes is intersected by a lateral axis that intersects the aperture. The perimeter surface also defines a first lateral cross-sectional width of the arm, at a first intersection of a longitudinal axis of the arm with the surface defining the aperture, that is greater than a second lateral cross-sectional width of the arm, at a second intersection of the longitudinal axis of the arm with the surface defining the aperture.

In some embodiments an actuator is provided that operably supports a component of a data transfer assembly. The actuator has a body and an arm extending longitudinally from the body. The arm has a tapered portion defined by laterally converging opposing surfaces from a proximal end of the arm adjacent the body and terminating at a medial longitudinal position of the arm. The arm further has a tip portion extending contiguously from the medial longitudinal position of the arm to a distal end of the arm. The tip portion has laterally opposing protuberant arcuate lobes that cooperatively define a maximum lateral width of the tip portion.

In some embodiments a method is provided that includes the steps of: obtaining an actuator having a longitudinally extending arm including a surface defining an aperture, the arm further having a perimeter surface defining opposing protuberant lobes, a lateral apex of at least one of the lobes laterally intersected by a lateral axis that intersects the aperture, and the perimeter surface defining a first lateral cross-sectional width of the arm, at a first intersection of a longitudinal axis of the arm with the surface defining the aperture, that is greater than a second lateral cross-sectional width of the arm, at a second intersection of the longitudinal axis of the arm with the surface defining the aperture; inserting a boss of a head gimbal assembly (HGA) into the aperture; and swaging the boss against the surface defining the aperture to affix the HGA and the arm together.

DETAILED DESCRIPTION

The embodiments of the present invention generally encompass an apparatus and associated methodology for controlling the distortion that can result from attaching a member, such as but not limited to by swaging the member. In the illustrative embodiments members are swaged together, the members being components of an actuator assembly that selectively positions a data transfer member with respect to a storage media. However, that disclosed application, as being used in a data storage device, is merely illustrative and not limiting of the scope of the claimed embodiments of the present invention.

Figure 1:
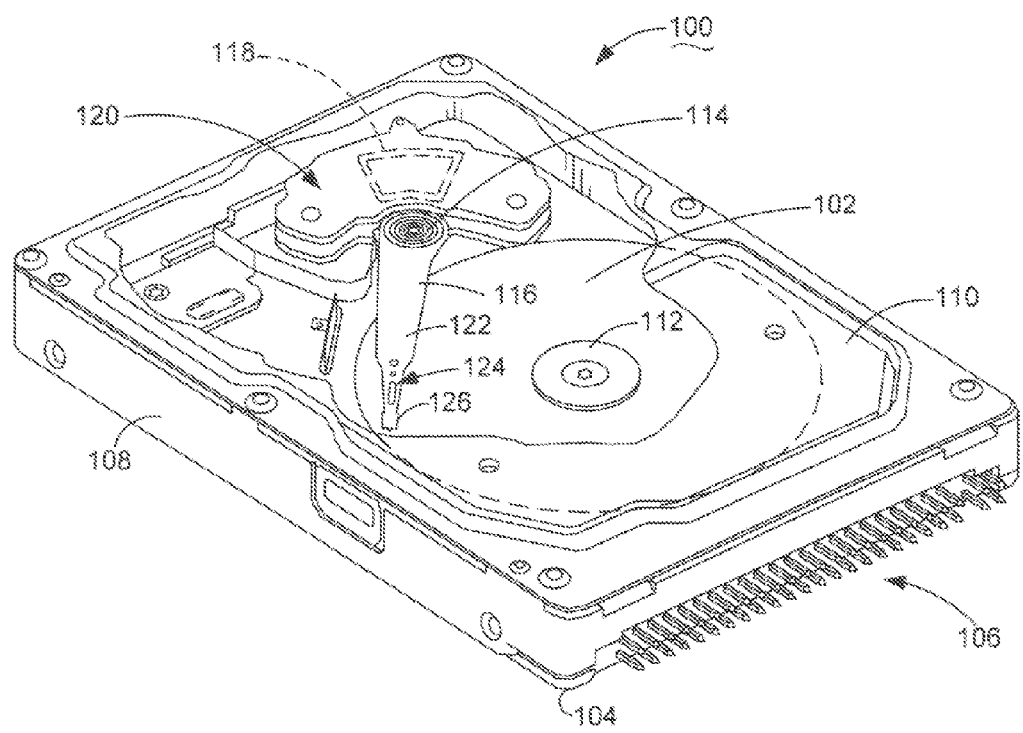
FIG. 1 is an isometric depiction of a data storage device that is constructed in accordance with illustrative embodiments of the present invention.

In order to set forth a detailed description of various embodiments of the present invention, reference is first made to FIG. 1 which depicts a data storage device in the form of a disc drive 100 that is used to store computer data. Although the disc drive 100 is used for illustrative purposes in the following description, the claimed embodiments are not so limited. The various embodiments described herein can be employed advantageously in a multitude of different devices, such as but not limited to optical storage devices, tape storage devices, hybrid storage devices, solid state storage devices, tiny machines like micro-electro-mechanical devices (MEMS), nano-electro-mechanical devices (NEMS), and the like where members are joined such as by crimping or swaging and the like. An enumeration of all such types of devices suited for use in practicing the claimed embodiments is not necessary for the skilled artisan to understand the scope of the claimed subject matter.

The disc drive 100 most generally includes a head-disc assembly (HDA) for storing data to and retrieving data from one or a plurality of stacked discs 102, and a printed wiring assembly (PWA) supporting control electronics used by the disc drive 100 to transfer data both internally and with an external device. The PWA includes a printed circuit board (PCB) 104 that is mounted to the underside of the HDA, having a plurality of pins 106 extending therefrom for communicating with the PCB.

The HDA includes a base 108 to which various disc drive components are mounted. A top cover 110, shown in partial cutaway fashion, cooperates with the base 108 to form a sealed housing for containing components of the HDA. A spindle motor 112, supported by the base 108, rotates the disc 102 (or disc stack) at a high speed during normal disc drive operation.

To access the discs 102, a selectively positionable actuator assembly includes a cartridge bearing 114 supported by the base 108, upon which an actuator 116 (sometimes referred to as "e-block") is journalled for rotation. The actuator 116 is selectively rotatable in response to currents applied to a coil 118 it supports of a voice coil motor (VCM) 120. The actuator 116 has a cantilevered arm 122 corresponding to each disc recording surface. The arms 122 move adjacent the disc recording surfaces; hence, they move within spaces provided between adjacent discs 102 in a disc stack. A head gimbal assembly (HGA) 124 is attached to each arm 122, the HGA 124 including a read/write head 126 that is operably placed in a data transfer relationship with the respective disc 102. As discussed below, it is the attachment of the HGA 124 to the arm 122, such as but not limited to by swaging, that illustrative embodiments of the present invention are directed to for purposes of this description.

Figure 2:
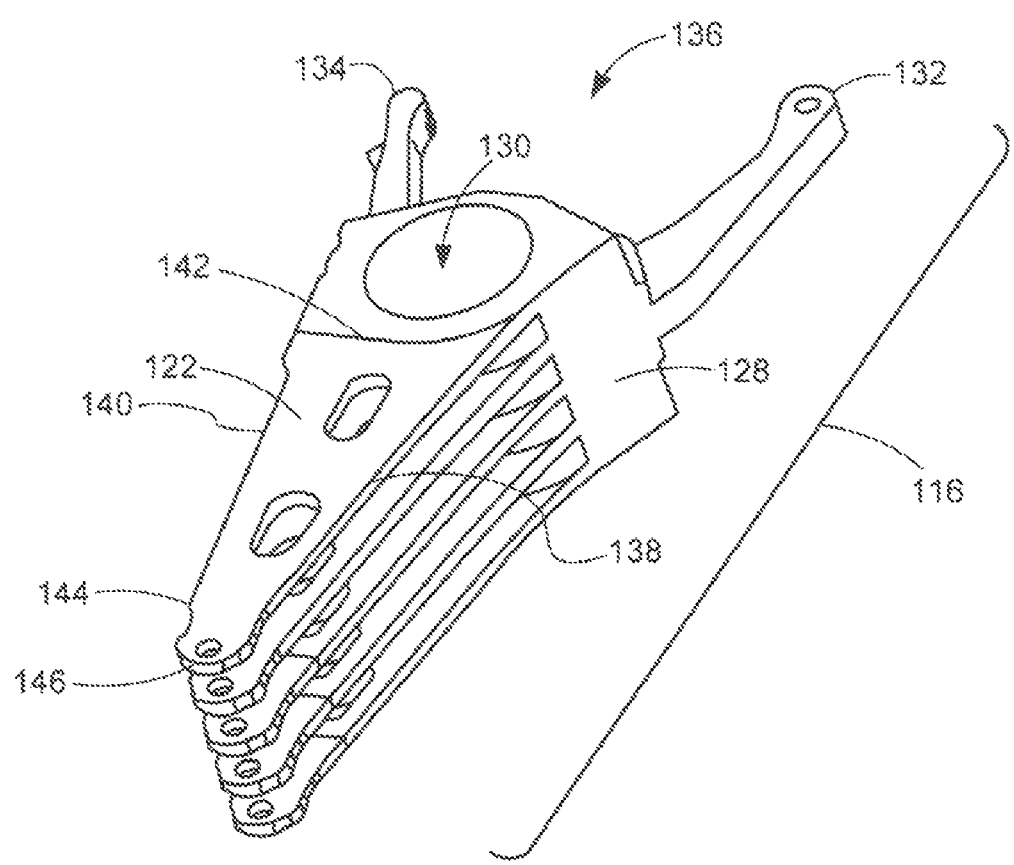
FIG. 2 is an enlarged isometric depiction of the actuator in the data storage device of FIG. 1.

FIG. 2 depicts the actuator 116 in these illustrative embodiments as having a body 128 defining a cylindrical passage 130 sized to receivingly engage the cartridge bearing 114 (FIG. 1). A pair of supports 132, 134 form a passage 136 into which the coil 118 (FIG. 1) of the VCM 120 is receivingly supported. Opposite the supports 132, 134 these illustrative embodiments depict five cantilevered arms 122 extending longitudinally from the body 128. To minimize the actuator's 116 moment of inertia, the mass is reduced by configuring the arm 122 to have a tapered portion defined by laterally converging opposing surfaces 138, 140 from a proximal end 142 of the arm 122 adjacent the body 128 and terminating at a medial longitudinal position 144 of the arm 122, the medial longitudinal position 144 being disposed between the proximal end 142 and a distal end 146 of the arm 122. For purposes of this description and meaning of the appended claims, the arm 122 has a "tip portion" extending contiguously from the medial longitudinal position 144 of the arm 122 to the distal end 146 of the arm 122.

Figure 3:
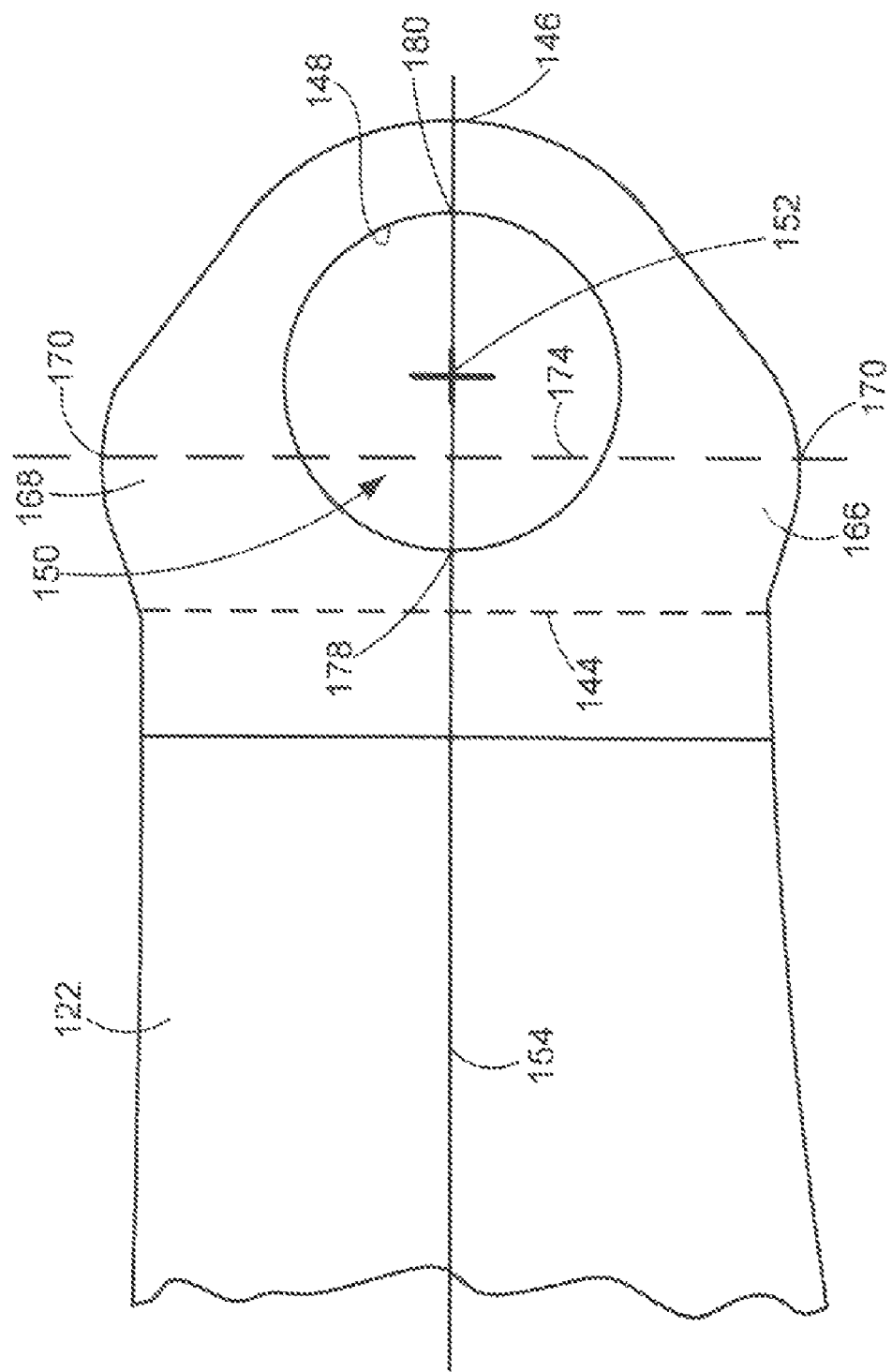
FIG. 3 is an enlarged plan view of the tip of one of the arms of the actuator of FIG. 2.

FIG. 3 is an enlarged depiction of the tip portion of the arm 122. In these illustrative embodiments the arm 122 has a circular surface 148 defining an aperture 150 having a center point 152 that is collinear with a longitudinal axis 154 of the arm 122. As described below, the aperture 150 is sized for operably swaging a mounting portion of the HGA 124 to the arm 122.

Figure 4:
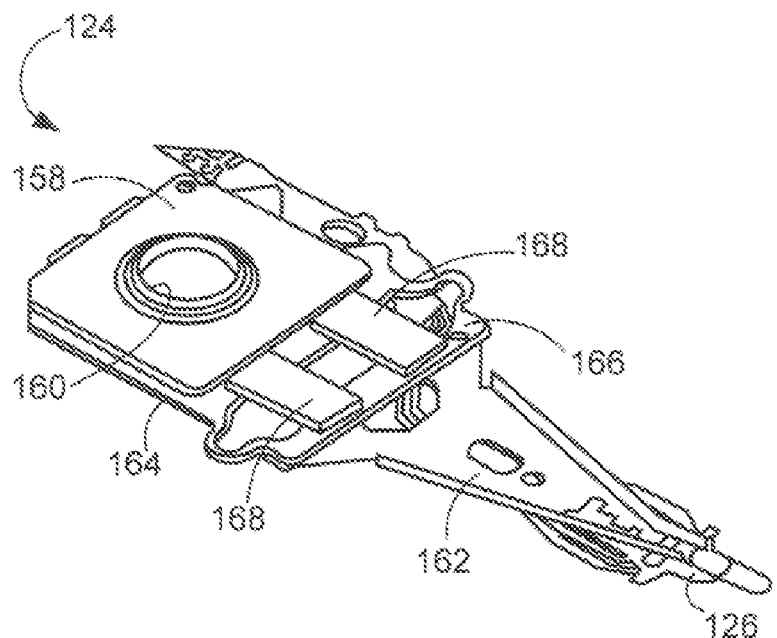
FIG. 4 is an enlarged isometric depiction of the HGA in the data storage device of FIG. 1.

Turning now to FIG. 4 which depicts an enlarged detail view of the HGA 124 in accordance with illustrative embodiments of the present invention. The HGA 124 depicted here has a swage plate 158 with an upstanding embossment ("boss") 160 that is sized to fit within the aperture 150 (FIG. 3) in the arm 122 in a close mating relationship. After being so receivingly disposed, a swaging tool is passed through the boss 160 to pressingly engage it against the surface 148 (FIG. 3) defining the aperture 150 to affix the swage plate 158 and the arm 122 together.

The HGA 124 has a load beam 162 that supports the read/write head 126 at a distal end thereof. In some types of simpler HGAs the load beam 162 is connected directly to the swage plate 158, or in other types of HGAs the load beam 162 and swage plate 158 are unitarily constructed. However, the HGA 124 depicted in FIG. 4 is constructed to function as a microactuator, meaning that the disc drive 100 can selectively move the read/write head 126 via the HGA 124 without rotating the actuator 116.

To achieve that microactuator capability, the swage plate 158 is attached to a stiffener plate 164. The stiffener plate 164 has a flexible portion 166 that is spatially separated from the rest of the stiffener plate by a void. A pair of piezoelectric transducers ("PZTs") 168 is attached to the stiffener plate 164 spanning the void, so that actuation of the PZTs can selectively result in displacement of the flexible portion 166. The load beam 162 is attached to the flexible portion 166 so that the selective displacement is imparted to the read/write head 126.

Use of the HGA 124 depicted in FIG. 4 necessitates some special considerations in the construction of the tip portion of the arm 122. For example, one consideration is evident by FIG. 3 depicting the web of material in the arm 122 at the distal end thereof is particularly narrow in order to clearingly disengage the arm 122 from the PZTs 168. That is, the length of a longitudinal web between the arcuate surface 148 and the perimeter surface is less than, and thereby weaker than, the length of a lateral web between the arcuate surface 148 and the perimeter surface. Another consideration is that the double stack of the swage plate 158 and stiffener plate 164 means the arm 122 must be comparatively thinner to clearingly fit within the same disc spacing as in other disc drives using the simpler HGA constructions discussed above.

Figure 5:
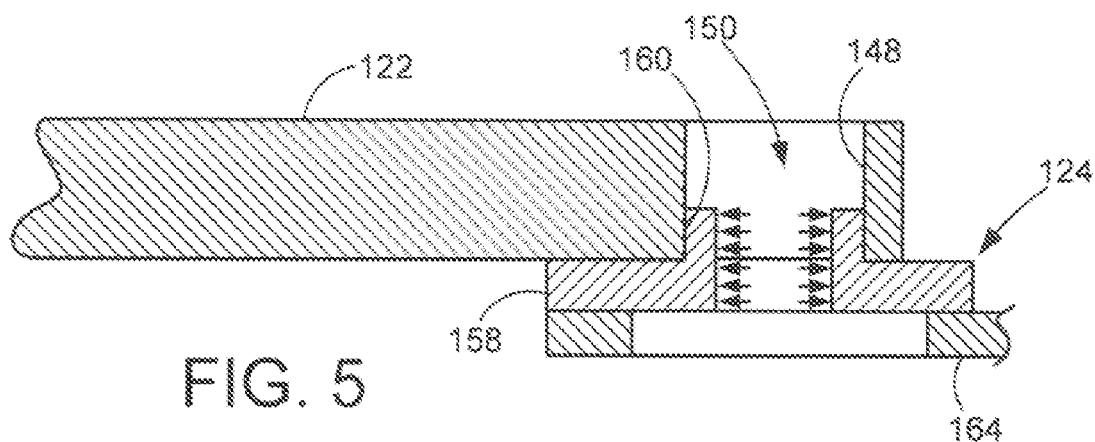
FIG. 5 is a cross-sectional depiction of the swaged connection of the HGA of FIG. 4 to the actuator of FIG. 2.

These special considerations, both the narrow distal web and the comparatively thin arm 122, can be problematic by causing plastic deformation in the arm 122 and/or HGA 124 as the result of swaging them together. The potential for problem is exacerbated when, as depicted in the cross-sectional view of FIG. 5, only one HGA 124 is swaged to an arm 122 as in the case of a top or bottom arm 122 that does not move in the space between adjacent discs 102. As depicted by the arrows in FIG. 5, the outwardly radial forces created by the swaging operation can cause arm tip deflection, resulting in undesirable variations in pitch static attitude and gram load offsets in the HGA 124.

Returning to FIG. 3, to counter those swaging forces that tend to cause arm tip deflection, in view of the special considerations for the arm 122 discussed above, the embodiments of the present invention contemplate configuring the tip portion of the arm 122 to have a perimeter surface defining opposing protuberant arcuate lobes 166, 168. Respective lateral apexes 170, 172 of the lobes 166, 168 in these illustrative embodiments are laterally collinear, in that they are intersected by a common lateral axis 174.

The lobes 166, 168 cooperatively define a maximum lateral width of the arm 122 in the tip portion. That maximum width is advantageously aligned with an observed bend axis around which the tip deflection otherwise occurs. In these illustrative embodiments the observed bend axis, and hence the common lateral axis 174, laterally intersects the aperture 150.

Resistance to tip deflection is provided by increasing the lateral cross-sectional size of the arm 122, and hence increasing the strength of the arm 122, at the bend axis. However, the necessary increased strength is preferably provided by only adding a minimal amount of material to the arm 122, in order to not interfere with the special considerations of the arm 122 discussed above and to minimize the moment of inertia. Thus, the lobes 166, 168 are advantageously made no larger than what is needed to control tip deflection to an extent desired. That is, with respect to the intersection of the arm longitudinal axis 154 with the surface 148 defining the aperture 150, note that the lateral cross-sectional width of the arm 122 at the intersection point 178 is significantly greater than the lateral cross-sectional width of the arm 122 at the intersection point 180. In fact, in the illustrative embodiments the maximum lateral cross-sectional width at axis 174 is significantly greater than both lateral cross-sectional widths at the intersections 178, 180 of the longitudinal axis 154 with the surface 148 defining the aperture 150.

Thus, the lobes 166, 168 are preferably made as small as possible to increase the mass of the arm 122 only where necessary to control tip deflection, thereby not interfering with the need for PZT clearance at the distal end of the arm and not adding unnecessarily to the arm's moment of inertia. For these reasons, the lobes 166, 168 are preferably arcuate as depicted with a single point lateral apex, and with smooth arcuate transitions to the adjoining perimeter surface.

In accordance with the structure described above, the claimed embodiments also contemplate a method including the step of obtaining the actuator 116 as described, one having the longitudinally extending arm 122 including the surface 148 defining the aperture 150, one further including the perimeter surface defining the opposing lobes 166, 168 with the lateral apex of at least one of the lobes 166, 168 intersected by the lateral axis 174 that also intersects the aperture 150, and one having the perimeter surface defining the first lateral cross-sectional width of the arm, at the first intersection 178 of the longitudinal axis 176 of the arm with the surface 148 defining the aperture 150, that is greater than the second lateral cross-sectional width of the arm, at the second intersection 180 of the longitudinal axis 176 of the arm with the surface 148 defining the aperture 150. The method also includes inserting the boss 160 of the HGA 124 into the aperture 150, and swaging the boss 160 against the surface 148 defining the aperture 150 in order to operably affix the HGA 124 and the arm 122 together.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, features of the illustrated embodiments can be interchanged and the particular elements may vary depending on the particular application while maintaining substantially the same functionality without departing from the scope and spirit of the present invention. In addition, although preferred embodiments described herein are illustrated with respect to a data storage system it will be appreciated by those skilled in the art that the teachings of the present invention can be applied to other systems as well without departing from the scope and spirit of the claimed invention.

What is claimed:

1. An actuator comprising a longitudinally extending arm having a surface defining an aperture sized for operably swaging a head gimbal assembly (HGA) to the arm, the arm further having a perimeter surface defining opposing protuberant lobes, a lateral apex of at least one of the lobes intersected by a lateral axis that intersects the aperture, and the perimeter surface defining a first lateral cross-sectional width of the arm, at a first intersection of a longitudinal axis of the arm with the surface defining the aperture, that is greater than a second lateral cross-sectional width of the arm, at a second intersection of the longitudinal axis of the arm with the surface defining the aperture.

2. The actuator of claim 1 wherein each respective lateral apex is intersected by a lateral axis that intersects the aperture.

3. The actuator of claim 2 wherein the lateral apexes are laterally collinear.

4. The actuator of claim 1 wherein a lateral cross-sectional width of the arm intersecting at least one of the apexes is greater than at least one of the lateral cross-sectional widths of the arm at intersections of a longitudinal axis of the arm with the surface of the arm forming the aperture.

5. The actuator of claim 1 wherein a lateral cross-sectional width of the arm intersecting at least one of the apexes is greater than both lateral cross-sectional widths of the arm at intersections of a longitudinal axis of the arm with an arcuate surface of the arm forming the aperture.

6. The actuator of claim 5 wherein the longitudinal axis of the arm intersects a center of the aperture.

7. The actuator of claim 1 wherein a length of a lateral web between the surface of the arm defining the aperture and the perimeter surface along a lateral axis extending through a center of the aperture is greater than a longitudinal web between the surface defining the aperture and the perimeter surface along a longitudinal axis extending through the center of the aperture.

8. The actuator of claim 1 wherein a lateral apex of at least one of the lobes is intersected by a first lateral axis that is non-collinear to a second lateral axis intersecting a center of the aperture.

9. The actuator of claim 8 wherein the first lateral axis is opposite a distal free end of the arm with respect to the second lateral axis.

10. The actuator of claim 1 wherein the arm extends longitudinally from a body, the perimeter surface further defining laterally converging surfaces from a proximal end of the arm adjacent the body and terminating at a medial longitudinal position of the arm, the lateral apexes of the lobes disposed in a tip portion of the arm extending contiguously from the medial longitudinal position of the arm to a distal end of the arm.

11. An actuator operably supporting a component of a data transfer assembly, the actuator comprising a body and an arm extending longitudinally from the body, the arm having a tapered portion defined by laterally converging opposing surfaces from a proximal end of the arm adjacent the body and terminating at a medial longitudinal position of the arm, and the arm further having a tip portion extending contiguously from the medial longitudinal position of the arm to a distal end of the arm, the tip portion having laterally opposing protuberant arcuate lobes that cooperatively define a maximum lateral width of the tip portion.

12. The actuator of claim 11 wherein the arm comprises a surface defining an aperture in the tip portion sized for operably attaching the component to the arm.

13. The actuator of claim 12 wherein a lateral apex of at least one of the lobes is intersected by a lateral axis that intersects the aperture.

14. The actuator of claim 12 wherein each respective lateral apex is intersected by a lateral axis that intersects the aperture.

15. The actuator of claim 14 wherein the lateral apexes are laterally collinear.

16. The actuator of claim 12 wherein a lateral cross-sectional width of the arm intersecting a lateral apex of at least one of the lobes is greater than at least one of the lateral cross-sectional widths of the arm at intersections of a longitudinal axis of the arm with the surface of the arm defining the aperture.

17. The actuator of claim 12 wherein a lateral cross-sectional width of the arm intersecting a lateral apex of at least one of the lobes is greater than both lateral cross-sectional widths of the arm at intersections of a longitudinal axis of the arm with the surface of the arm defining the aperture.

18. The actuator of claim 17 wherein the longitudinal axis of the arm intersects a center of the aperture.

19. The actuator of claim 12 wherein an apex of at least one of the lobes is intersected by a first lateral axis that is non-collinear to a second lateral axis intersecting a center of the aperture.

20. A method comprising:
obtaining an actuator having a longitudinally extending arm including a surface defining an aperture, the arm further having a perimeter surface defining opposing protuberant lobes, a lateral apex of at least one of the lobes laterally intersected by a lateral axis that intersects the aperture, and the perimeter surface defining a first lateral cross-sectional width of the arm, at a first intersection of a longitudinal axis of the arm with the surface defining the aperture, that is greater than a second lateral cross-sectional width of the arm, at a second intersection of the longitudinal axis of the arm with the surface defining the aperture;
and
swaging a head gimbal assembly to the arm.

* * * * *